Aug. 14, 1962 P. E. WILKINS 3,049,465
METHOD FOR JOINING PLASTIC ARTICLES
Filed Nov. 4, 1957

FROM POWER SOURCE

INVENTOR.
P. E. WILKINS
BY Hudson and Young
ATTORNEYS.

United States Patent Office

3,049,465
Patented Aug. 14, 1962

3,049,465
METHOD FOR JOINING PLASTIC ARTICLES
Paul E. Wilkins, Bartlesville, Okla., assignor to Phillips Petroleum Company, a corporation of Delaware
Filed Nov. 4, 1957, Ser. No. 694,221
10 Claims. (Cl. 156—272)

This invention relates to an improved method for joining articles of thermoplastic materials. In one aspect, it relates to an improved method for joining sections of thermoplastic pipe. In another aspect, it relates to an improved method for joining sections of thermoplastic material by a welding operation.

Thermoplastics are becoming increasingly important as materials of construction for special uses such as pipes for handling corrosive fluids and for articles which must withstand corrosion and which must be non-conductors for electricity. Thermoplastics are also becoming important for general use as materials of construction for pipes in general and for articles which are extruded, molded, or machined. Pipe joints have been successfully made, with respect to thermoplastic materials such as polyethylene, by welding, by flange connections and by threaded joints. These types of joints, however, have disadvantages in that certain uses, and as an example the welding of pipes in field service, are time consuming and require the presence of a skilled person. As another example, the use of flanges is time consuming, expensive and cumbersome. Threaded couplings are often preferred where they can be used for reasons of convenience and economy; however, threaded fittings have not been entirely successful in thermoplastic pipes where the materials are subject to notch sensitivity and to cold creep characteristics.

It is, therefore, a principal object of this invention to provide an improved method and means for joining sections of thermoplastic materials. It is another object to provide an improved method for joining together lengths of thermoplastic pipe by a welding operation. A further object of the invention is to provide an improved method for repairing broken thermoplastic articles. Other and further objects and advantages of this invention will be apparent to one skilled in the art upon studying this disclosure, including the attached drawing and the detailed description of the invention.

Figure 1:
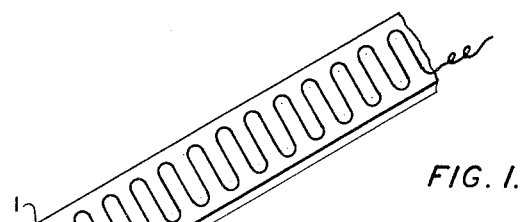

FIGURE 1 shows a preferred embodiment of the thermoplastic mending tape of the invention.

Figure 2:
Figure 3:
Figure 4:
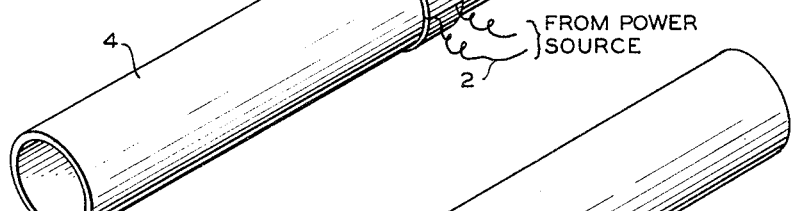

FIGURE 2, FIGURE 3, and FIGURE 4 illustrate the steps of joining sections of thermoplastic pipe according to the process of the invention.

Broadly, the invention contemplates an improved method for joining sections of thermoplastic materials by applying thereto a thermoplastic tape having an electrical resistance element secured thereto and applying current to the resistance element so as to soften the tape and a portion of the article to be mended so as to provide a firm junction. The resistance element can be a wire, ribbon or other known conductor used for supplying heat. The element can be molded, bent or cast into the desired shape. The method of the invention has particular utility in joining sections of thermoplastic pipes and can be utilized where other methods are inoperable or undesirable. The invention is also applicable for repairing leaks in pipe which is in position without the necessity for removing the pipe from service or from its position. The tape can conveniently be secured to the pipe by clamps, such as garden hose clamps, by wrapping with cloth, asbestos tape, etc., or by any other means. The invention is equally applicable for repairing various thermoplastic articles by applying the tape to the pieces of the broken article and causing a weld at that junction.

The resistance element, preferably a wire, is secured to the thermoplastic tape adjacent one side and the side having the resistance wire at or near its surface is applied to the surface of the articles to be joined so that a portion of the articles to be joined as well as the tape is heated to the softening point so as to cause fusion of the tape embedded in the surface of the tape, for example by the application of heat and pressure, or can be attached to the surface of the tape by any convenient means such as by an adhesive material. A satisfactory adhesive for securing metal to solid 1-olefin polymers is a brominated or chlorinated polymer of a 1-olefin which is dispersed in a suitable organic medium such as carbon tetrachloride or carbon disulfide. Such adhesives are described in copending application Serial No. 686,604, filed September 27, 1957, by R. T. Werkman et al. (Case 8337).

The resistance of any metal wire is a function of the diameter and length of the wire, therefore, various widths and thicknesses of tape can be constructed so as to require a definite voltage for a given time in order to effect softening of the thermoplastic material and fusion of this material with the thermoplastic material being welded by adjustment of the length and diameter of the wire attached to the surface of the tape. Resistance wires are well known in the art and include copper, silver, iron, and various alloys such as alloys of chromium and nickel. Any resistance wire can be employed and it is only necessary to determine the resistance of the particular wire employed. The resistance wire is advantageously attached to the surface of the tape in a series of undulations or turns so that substantially the entire surface of the tape and the adjoining thermoplastic material will be subjected to heating during the welding period. The turns of the resistance element will usually be normal to the longitudinal axis of the strip with the overall length of the element parallel with the longitudinal axis of the strip but it is within the scope of the invention to attach the resistance element in the reverse position or in any other configuration to achieve satisfactory heating of substantially all of one flat surface of the strip. It may sometimes be desirable to attach the resistance element to a section of the strip and utilize the remainder of the strip for external wrapping.

Thermoplastic materials in general, which are sufficiently plastic to provide strips which can be made to conform to the contours of the articles to be joined, are applicable for use in the invention and such thermoplastic materials include polyethylene, polyvinyl chloride, polyvinylidene chloride, polytetrafluoroethylene, cellulose acetate, and similar thermoplastic materials.

A recent discovery in the art of making 1-olefin polymers in general and a polymer of polyethylene in particular, has created a new and widespread interest in these polymers. This discovery is a method for making polyethylene which has a high degree of crystallinity with the concomitant benefits of high melting point, high density, and high value of tensile strength. The new technique of olefin polymerization is applicable to 1-olefins having a maximum of 8 carbon atoms per molecule and no branching nearer the double bond than the 4-position and is carried out at temperatures and pressures which are relatively low as compared with conventional processes for polymerizing such olefins. A process for such polymerization is disclosed in copending application of Hogan et al. of March 26, 1956, Serial No. 573,877, wherein polymers of 1-olefins are produced by carrying out the polymerization at a temperature in the range of 100 to about 500° F., in the presence of 0.1 to about 10 or more weight percent of chromium oxide, preferably including a substantial proportion of hexavalent chromium associated with at least one porous oxide selected from the group consisting of silica, alumina, zirconia, and thoria. A preferred catalyst in this process is one comprising about 0.1 to 10 or more weight percent chromium as chromium oxide supported upon a silica-alumina base such as 90 percent silica–10 percent alumina. The catalyst employed is ordinarily a highly oxidized catalyst which condition has been achieved by treatment at an elevated temperature under non-reducing conditions and preferably in an oxidizing atmosphere. Olefins, other than 1-olefins as described, are polymerized by reaction of this catalyst but some such polymers are predominantly liquid, at least when polymerized under the described conditions. Polymerization suitably is carried out in the presence of a hydrocarbon solvent or diluent, especially a paraffin or a cycloparaffin which is liquid under the polymerization conditions; however, vapor phase operation or mixed phase operation can be effected. Diolefins such as 1,3-butadiene and isoprene are within the scope of this process. Solid ethylene polymers include polyethylene and copolymers comprising ethylene and a 1-olefin such as propylene, 1-butene and the like wherein the ratio of ethylene to higher molecular weight 1-olefin is such that solid polymers are produced. Polyethylene made in accordance with this third process has a crystallinity of at least 70 percent, usually at least about 80 percent, and is preferably at least 90 percent, at 25° C. The crystallinity is determined preferably by measurements of nuclear magnetic resonance (Wilson and Pake, Journal of Polymer Science X, 503 (1953)), using a sample of polymer which is in a state approaching equilibrium at 25° C. These ethylene polymers usually have a density of at least 0.94, preferably at least 0.95, at 25° C. The softening point of such polymers will vary with the particular polymer used, increasing as the density and crystallinity of polymer increases. Generally, the softening point of polyethylene is above about 200° F., frequently in the approximate range of 250 to 300° F.

Referring now to the drawing, FIGURE 1 shows a strip of thermoplastic 1 having a resistance wire 2 secured to the surface thereof in a series of reverse turns.

FIGURE 2 shows thermoplastic pipe sections 3 and 4 butted together in preparation for the welding operation.

FIGURE 3 shows the mending tape 1 in position around the junction of pipe sections 3 and 4 with the two ends of resistance wire 2 in position for being connected to a voltage source (not shown).

FIGURE 4 shows the finished weld with the ends of resistance wire 2 snipped off.

The following specific embodiment of the invention is exemplary but is not intended to limit the invention. Polyethylene was produced by the process disclosed in copending application Serial No. 573,877, filed March 26, 1956, by Hogan et al., now Patent No. 2,825,721, wherein ethylene was polymerized in the presence of liquid cyclohexane and a catalyst comprising a coprecipitated silica-alumina (90–10) base impregnated with chromium oxide containing an appreciable amount of hexavalent chromium. The resulting polyethylene had a crystallinity of 93 to 95 percent.

A number 30 Nichrome (trademark for nickel-chromium alloy) wire was bent into a series of adjacent turns and was embedded in the surface of a strip of the above polyethylene ½ inch wide and about 35/1000 inch thick. The length of wire between turns was ⅜ of an inch and the space between the turns was ⅛ of an inch. Two sections of 2-inch polyethylene pipe, fabricated from polyethylene prepared as above described, were butted end to end and the joint was wrapped with about 2 feet of the prepared tape and the ends of the resistance wire were connected to a source of 120 volt A.C. potential through a variable transformer. Approximately 55 volts were applied to the resistance wire for a period of about 30 to 45 seconds and the tape softened at the surface of the pipe and fused with the softened surface of the pipe. The resulting joint, after cooling to room temperature, was substantially as strong as the remaining sections of pipe and no leaks were detected. Sufficient voltage was applied to impart a blue color to the resistance wire. This indicates a temperature of about 550 to about 600° F.

Reasonable variations and modifications are possible within the scope of the disclosure as described and illustrated without departing from the spirit and scope of the invention.

That which is claimed is:

1. An improved method for joining together adjacent sections of thermoplastic pipe which comprises securing a length of resistance element to the surface of a single deformable strip of thermoplastic material in a series of adjacent turns in contact with the surface of the strip; placing the sections of pipe to be joined together in contiguous end-to-end relationship; wrapping the strip around the pipes at the junction of the pipes with the resistance element adjacent the junction; connecting the ends of the resistance element to a source of electric potential; applying sufficient potential to said resistance element to raise its temperature above the softening temperature of the thermoplastic material; maintaining the application of potential for a period of time sufficient to soften at least a portion of said strip and said pipes at said junction; and maintaining said strip in contact with said junction until the pipe has cooled to below the softening temperature.

2. The method of claim 1 wherein the thermoplastic material is polyvinyl chloride.

3. The method of claim 1 wherein the thermoplastic material is cellulose acetate.

4. The method of claim 1 wherein the thermoplastic pipe sections and the thermoplastic strip are ethylene polymers.

5. The method of claim 4 wherein the ethylene polymer is polyethylene.

6. The method of claim 4 wherein the ethylene polymer is a copolymer of ethylene and propylene.

7. The method of claim 4 wherein the ethylene polymer is a copolymer of ethylene and 1-butene.

8. The method of claim 1 wherein the thermoplastic pipe sections and the thermoplastic strip are polypropylene.

9. An improved method for joining sections of pipe of normally solid polyethylene which comprises securing, with an adhesive comprising chlorinated polyethylene dispersed in carbon tetrachloride, a length of resistance element to one of the flat surfaces of a deformable strip of polyethylene in a series of reverse turns so as to supply heat to substantially the entire flat surface of the strip when an electrical potential is applied to said resistance element; wrapping the deformable strip of polyethylene, with the resistance element attached, around the pipe so that the strip is in contact with the sections of pipe to be joined with the resistance element in contact with the sections of the pipe; connecting the ends of the resistance element to a source of electric potential; applying sufficient potential to said resistance element to raise its temperature above the softening temperature of the polyethylene; maintaining the application of potential for a period of time sufficient to soften at least a portion of said pipe and of said strip; and maintaining said strip in contact with said junction until the polyethylene has cooled to below the softening temperature.

10. An improved method for repairing a leak in a length of thermoplastic pipe which comprises securing a length of resistance element to the surface of a single deformable strip of thermoplastic material in a series of adjacent turns in contact with the surface of the strip; wrapping the strip around the pipes at the locus of the leak with the resistance element adjacent the leak; connecting the ends of the resistance element to a source of electric potential; applying sufficient potential to said resistance element to raise its temperature above the softening temperature of the thermoplastic material; maintaining the application of potential for a period of time sufficient to soften at least a portion of said strip and said pipe at the locus of the leak; and maintaining said strip in contact with the pipe until the pipe has cooled to below the softening temperature.

References Cited in the file of this patent

UNITED STATES PATENTS

| | | |
|---|---|---|
| 2,378,801 | Sidell et al. | June 19, 1945 |
| 2,630,398 | Brooks et al. | Mar. 3, 1953 |
| 2,713,017 | Bruns | July 12, 1955 |
| 2,719,907 | Combs | Oct. 4, 1955 |
| 2,739,829 | Pedlow et al. | Mar. 27, 1956 |
| 2,742,390 | Back | Apr. 17, 1956 |
| 2,762,791 | Pease et al. | Sept. 11, 1956 |

FOREIGN PATENTS

| | | |
|---|---|---|
| 26,644 | Great Britain | 1898 |
| 585,186 | Great Britain | Jan. 31, 1947 |